(12) United States Patent
Furuse et al.

(10) Patent No.: US 6,382,675 B1
(45) Date of Patent: May 7, 2002

(54) ATTACHING STRUCTURE FOR WHEEL HOUSE COVER

(75) Inventors: Yoshinobu Furuse; Sumio Horiuchi, both of Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/635,122

(22) Filed: Aug. 9, 2000

(30) Foreign Application Priority Data

Aug. 9, 1999 (JP) .......................................... 11-224800

(51) Int. Cl.⁷ .............................. B62B 9/14; B60R 19/00
(52) U.S. Cl. ...................... 280/847; 280/848; 280/849; 280/160
(58) Field of Search ................................ 280/847, 848, 280/549, 160

(56) References Cited

U.S. PATENT DOCUMENTS

| | | | | |
|---|---|---|---|---|
| 2,161,161 A | * | 6/1939 | Harroun ..................... | 280/848 |
| 2,222,624 A | * | 11/1940 | Mills ......................... | 280/848 |
| 2,257,556 A | * | 9/1941 | Webb ......................... | 280/848 |
| 2,261,376 A | * | 11/1941 | Jandus ....................... | 280/848 |
| 2,274,134 A | * | 2/1942 | Fergueson et al. ........... | 280/848 |
| 2,427,160 A | * | 9/1947 | Reynolds .................... | 280/848 |
| 2,474,852 A | * | 7/1949 | Lyon .......................... | 280/848 |
| 2,557,146 A | * | 6/1951 | Schatzman .................. | 280/848 |
| 2,606,773 A | * | 8/1952 | Schatzman .................. | 280/848 |
| 2,611,628 A | * | 9/1952 | Schatzman .................. | 280/848 |
| 2,811,373 A | * | 10/1957 | Schatzman .................. | 280/848 |
| 2,866,652 A | * | 12/1958 | Schatzman .................. | 280/848 |
| 3,584,898 A | * | 6/1971 | Pearson et al. ............. | 280/848 |

FOREIGN PATENT DOCUMENTS

| | | | | |
|---|---|---|---|---|
| JP | 62-141581 | | 9/1987 | .......... B62D/25/16 |
| JP | 2102880 A | * | 4/1990 | .......... B62D/25/18 |

* cited by examiner

*Primary Examiner*—Brian L. Johnson
*Assistant Examiner*—Joselynn Y Sliteris
(74) *Attorney, Agent, or Firm*—Sughrue Mion, PLLC

(57) ABSTRACT

A structure for detachably attaching a wheel housing cover to a vehicle body. Provided along the reverse side of a wheel house cover (2) on a peripheral edge are engagement parts (2E, 2F) having upwardly opened engagement holes (2E1, 2F1). In the vicinity of a lower part of the wheel house cover (2) are an insertion hole (2J1, 2K1) for a stud fastener at a front edge rib (2B) and a rear edge rib (2C). A vehicle body is provided with locking parts relatively and downwardly inserted into the corresponding engagement holes (2E1, 2F1) so as to lock said engagement parts (2E, 2F), and is further provided with nut members of receiving parts for receiving the stud fastener.

16 Claims, 10 Drawing Sheets

ATTACHING STRUCTURE FOR WHEEL HOUSE COVER

FIELD OF THE INVENTION

The present invention relates to structure for detachably attaching a wheel house cover to a vehicle body, and more particularly, to an attaching structure for a wheel house cover, wherein the wheel house cover is easy to attach and detach, the formation of rust on a vehicle body side can be reduced and the vehicle body has a good appearance.

BACKGROUND OF THE INVENTION

To improve aerodynamics of a vehicle, a wheel house cover to cover a wheel house of a vehicle body is adapted. In this case, since the wheel house cover is an obstacle when passing through a car wash and during the changing of a tire, the wheel house cover is detachably attached to the vehicle. Among structures to attach a wheel house cover to a vehicle body detachably, a structure described in JP-U-62-141581 or other various structure is adapted. In FIG. 11, the conventional art is shown. On a top of a reverse side of a wheel house cover A, an engagement hook B, which is protruded from a top edge thereof, is placed and formed side-by-side on three points. On a lower part of the reverse side of the wheel house cover A, a clip receive hole C is placed and formed side-by-side on two points. On a body panel D of a vehicle, an engagement hole E into which each engagement hook B is inserted is formed side-by-side on three points and a lined pair of clips F to be inserted into the clip receive hole C is placed.

In the conventional art shown in FIG. 11, each engagement hook B on the side of the wheel house cover A is aligned with the engagement hole E on the side of the body panel D and inserted diagonally in an upward direction. The lower part of the wheel house cover A is pushed to the side of the body panel D and turned. This state is held and the clip F is engaged with the clip receive hole C of the wheel house cover A, therefore, the wheel house cover A is attached to the body panel D.

In the above-described conventional art, when the wheel house cover A is attached to the vehicle body after a car wash or a changing of a tire, the engagement hooks B, B need to be inserted into the corresponding engagement holes E, E on the side of the body panel D diagonally in an upward direction. The engagement hook B is protruded from a top edge of the wheel house cover A. The lower part of the wheel house cover A needs to be pushed to the side of the body panel D and turned. In this state, the clip F needs to be engaged with the clip receive hole C at the reverse side of the wheel house cover A. Therefore, in the conventional art, the attachment process of the wheel house cover A is a troublesome task. Each engagement hole E is formed on the side of the body panel D, therefore, rainwater remains in the vicinity of each engagement hole E and rust often forms. When the wheel house cover A is attached, a part of each engagement hook B as a functional part is exposed in a uniform clearance between the top edge of the wheel house cover A and the body panel D. Therefore, the appearance in the vicinity of the wheel house cover A is spoiled.

An object of the present invention is to provide an attaching structure for a wheel house cover, wherein the wheel house cover is easy to attach and detach from the vehicle body, the formation of rust on a vehicle body side can be reduced, and the vehicle body has a good appearance.

SUMMARY OF THE INVENTION

To solve the above-described problems, according to structure for detachably attaching a wheel house cover to a vehicle body of the present invention, said wheel house cover is provided along the reverse side of its peripheral edge with engagement parts having upwardly opened engagement holes or engagement concaves and in the vicinity of its lower part with an insertion hole for a tightening member at a front and a rear of the peripheral edge. The vehicle body is provided with locking parts relatively and downwardly inserted into the corresponding engagement holes or engagement concaves so as to lock said engagement parts, and further with receiving parts for receiving said tightening member to be inserted into said insertion holes of said wheel house cover.

According to the structure of the present invention, the engagement parts of the wheel house cover are placed on a lower part of the locking part on the vehicle body. In this state, the wheel house cover is pushed and controlled upwardly and relatively with respect to the vehicle body. The locking parts on the vehicle body side approach downwardly and relatively with respect to the engagement holes or engagement concaves of the engagement parts on the wheel house cover, and in this state, the engagement part is locked. The tightening member receives the receiving part at the vehicle body through the insertion hole from the outside of the wheel house cover, therefore, the wheel house cover can be detachably attached to a vehicle body. In this way, according to the structure of the present invention, for attaching the wheel house cover, it is only needed to push and control the wheel house cover in one direction with respect to the vehicle body and to tighten the wheel house cover from the outside thereof. Therefore, it is easy to attach the wheel house cover to the vehicle body.

According to the structure of the present invention, said vehicle body is provided with a pair of support parts, which projects from said vehicle body for placing at least two front and rear engagement parts of said wheel house cover, and the pair of support parts is placed at vertical positions where said engagement parts of said wheel house cover are temporarily positioned directly below said locking parts of said vehicle body. According to the structure, the two front and rear engagement parts of the wheel house cover are placed on the pair of support parts of the vehicle body and the engagement parts of the wheel house cover are temporarily positioned directly below the locking part of the vehicle body. Therefore, it is easy to attach and detach the wheel house cover.

According to the structure of the present invention, locking members in the shape of a downwardly projecting hook are fixed to said vehicle body, and said locking parts of said vehicle body are formed by said hooks of said locking members. According to the structure, in a state in which the wheel house cover is attached, the hook of the locking member at the vehicle body projects downwardly and is hidden behind a reverse side of the wheel house cover. Therefore, the vehicle body can have a good appearance.

According to the structure of the present invention, each of said insertion holes is formed at a front and a rear foot parts, each projecting from said wheel house cover, and said foot parts are placed at blind spots of a lower edge part of said wheel house cover. According to the structure, in a state in which the wheel house cover is attached, the foot part and the tightening member are placed at the blind spots of the lower edge part at the wheel house cover. Therefore, the vehicle body can have a good appearance.

According to the structure of the present invention, said tightening member is a stud fastener, and said receiving part of said vehicle body is formed by a nut member fixed to said vehicle body, and further said nut member has a guide plate which guides the front end of said stud fastener toward a nut part. According to the structure, when the wheel house cover is moved upwardly with respect to the vehicle body and attached to the vehicle body, the guide plate of the nut member guides the front end of the stud fastener toward the nut part. Therefore, it is easy to receive the stud fastener.

DESCRIPTION OF THE PREFERRED EMBODIMENTS

Figure 1:
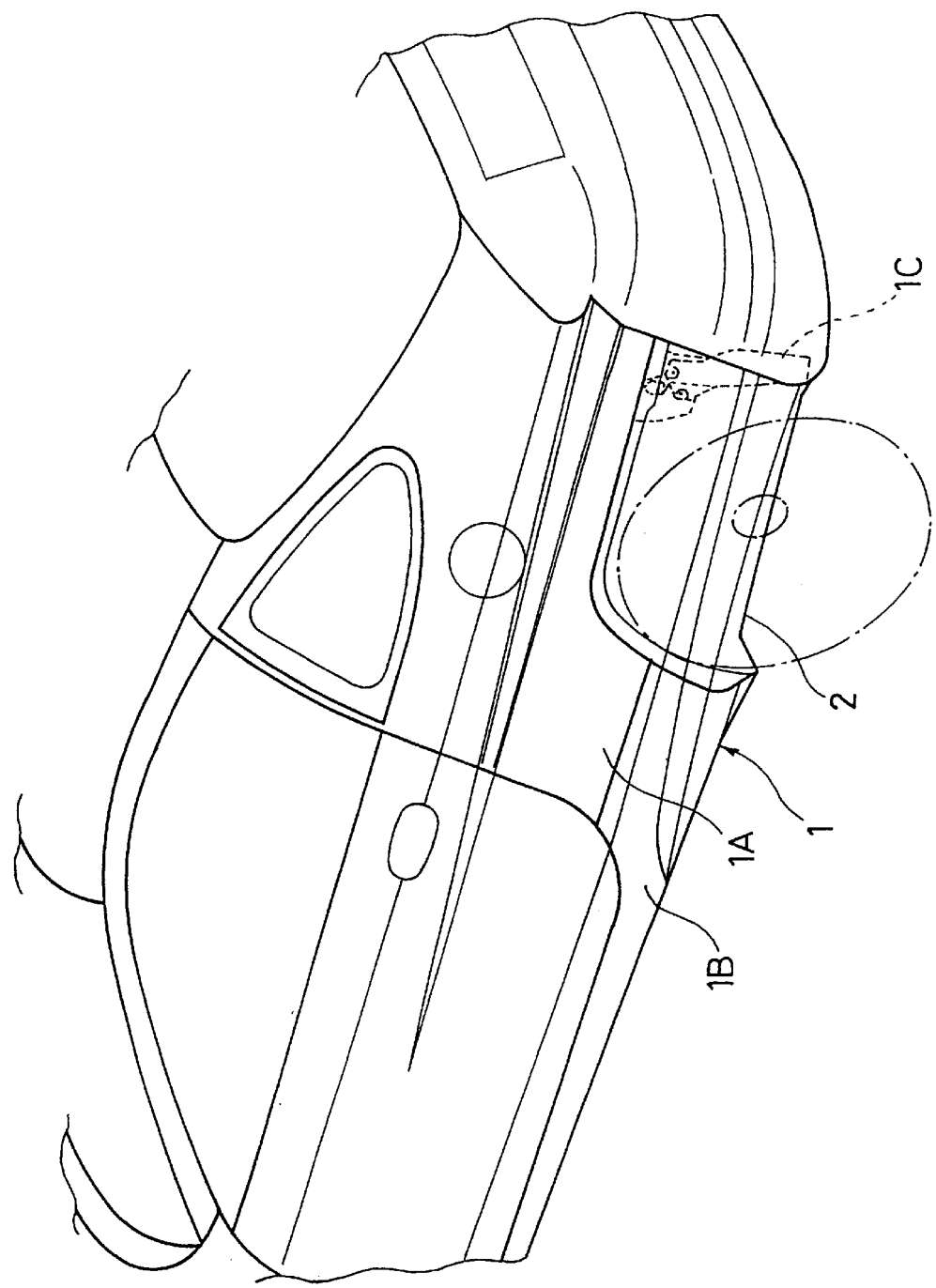
FIG. 1 is a perspective view in the vicinity of a wheel house cover of a vehicle body to which an attaching structure for a wheel house cover is applied according to an embodiment of the present invention.
Figure 2:
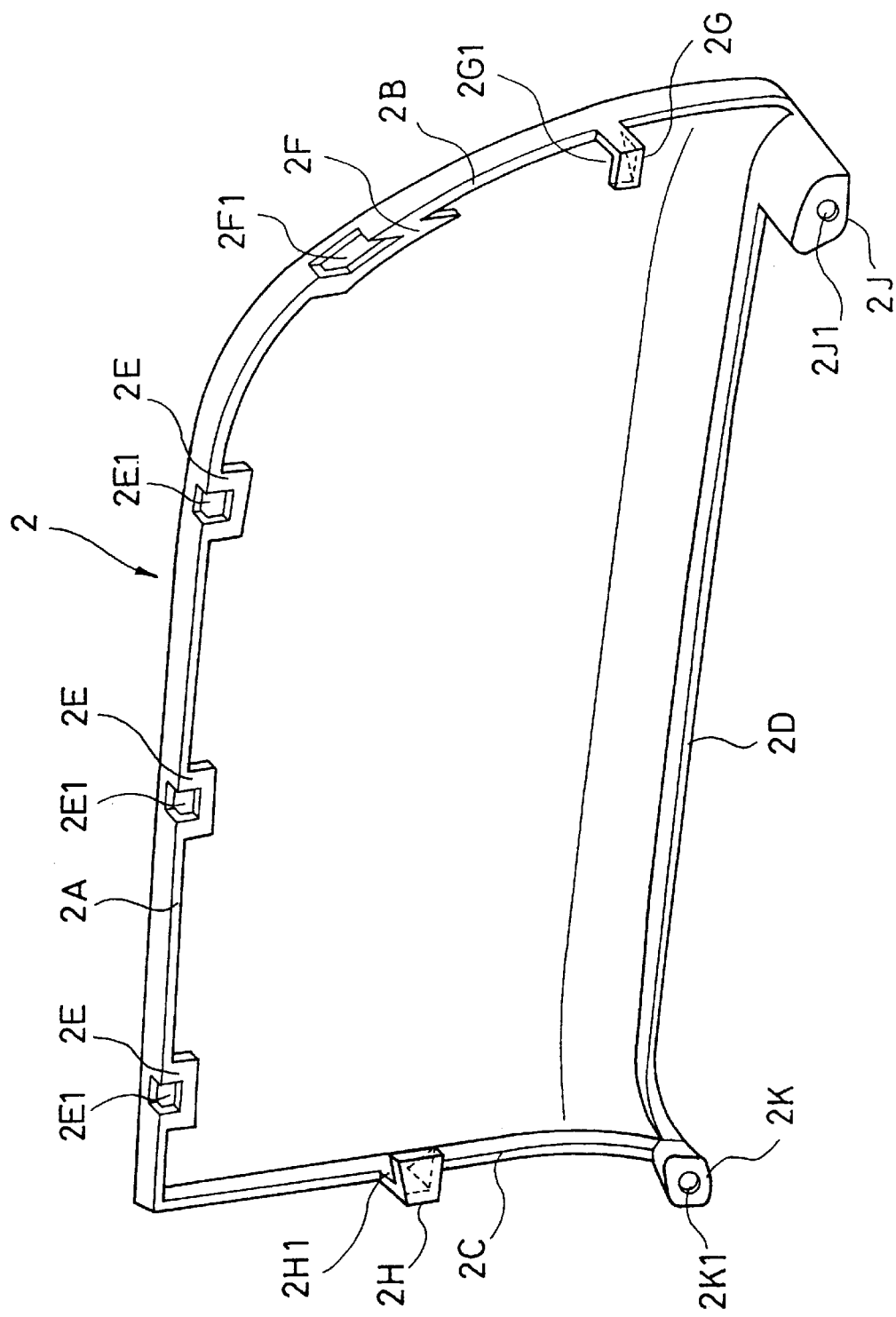
FIG. 2 is a perspective view of a reverse side structure of the wheel house cover of the attaching structure for a wheel house cover according to the embodiment.
Figure 3:
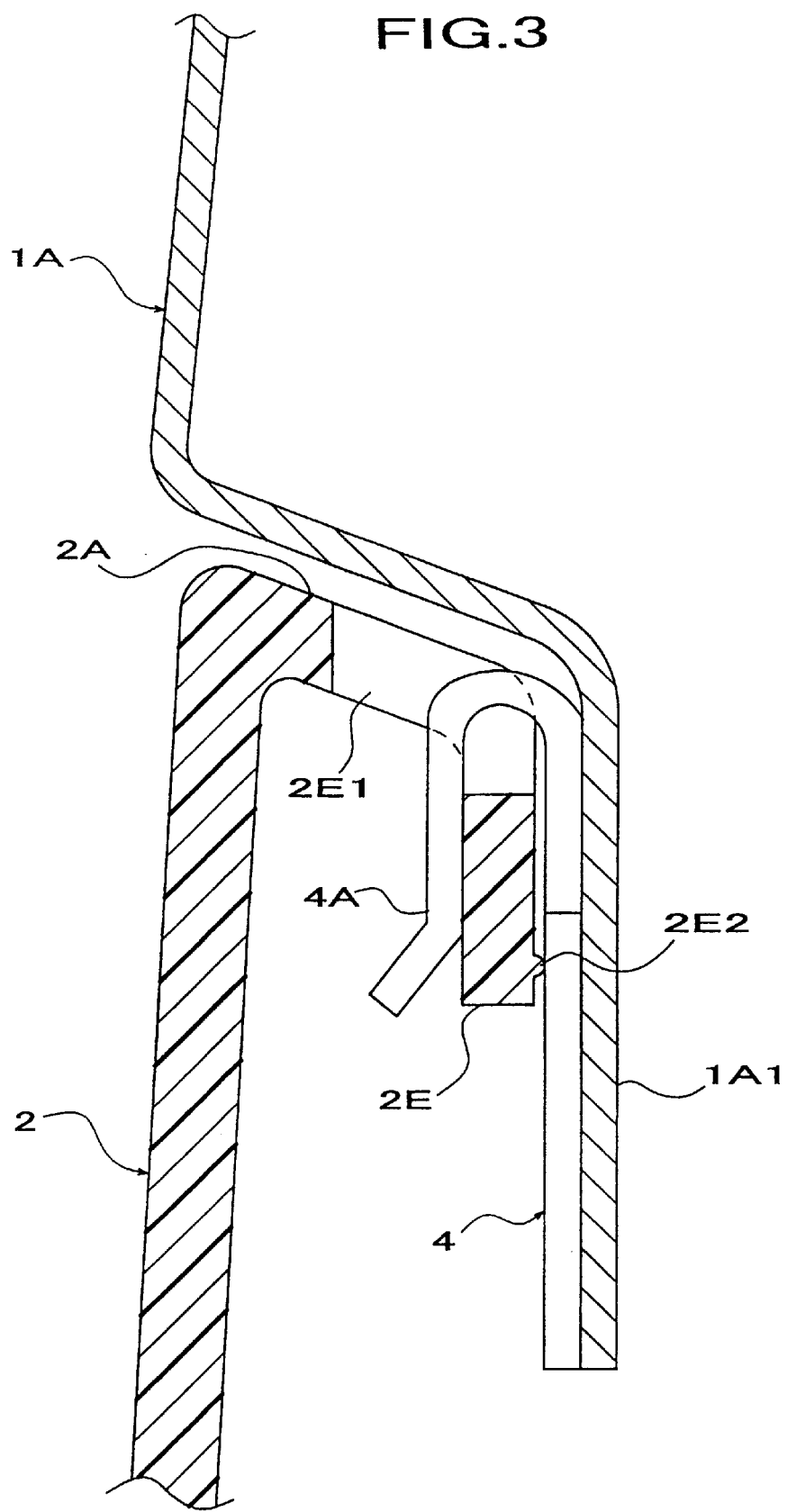
FIG. 3 is a section showing the engagement structure of the wheel house cover of the attaching structure for a wheel house cover according to the embodiment.
Figure 4:
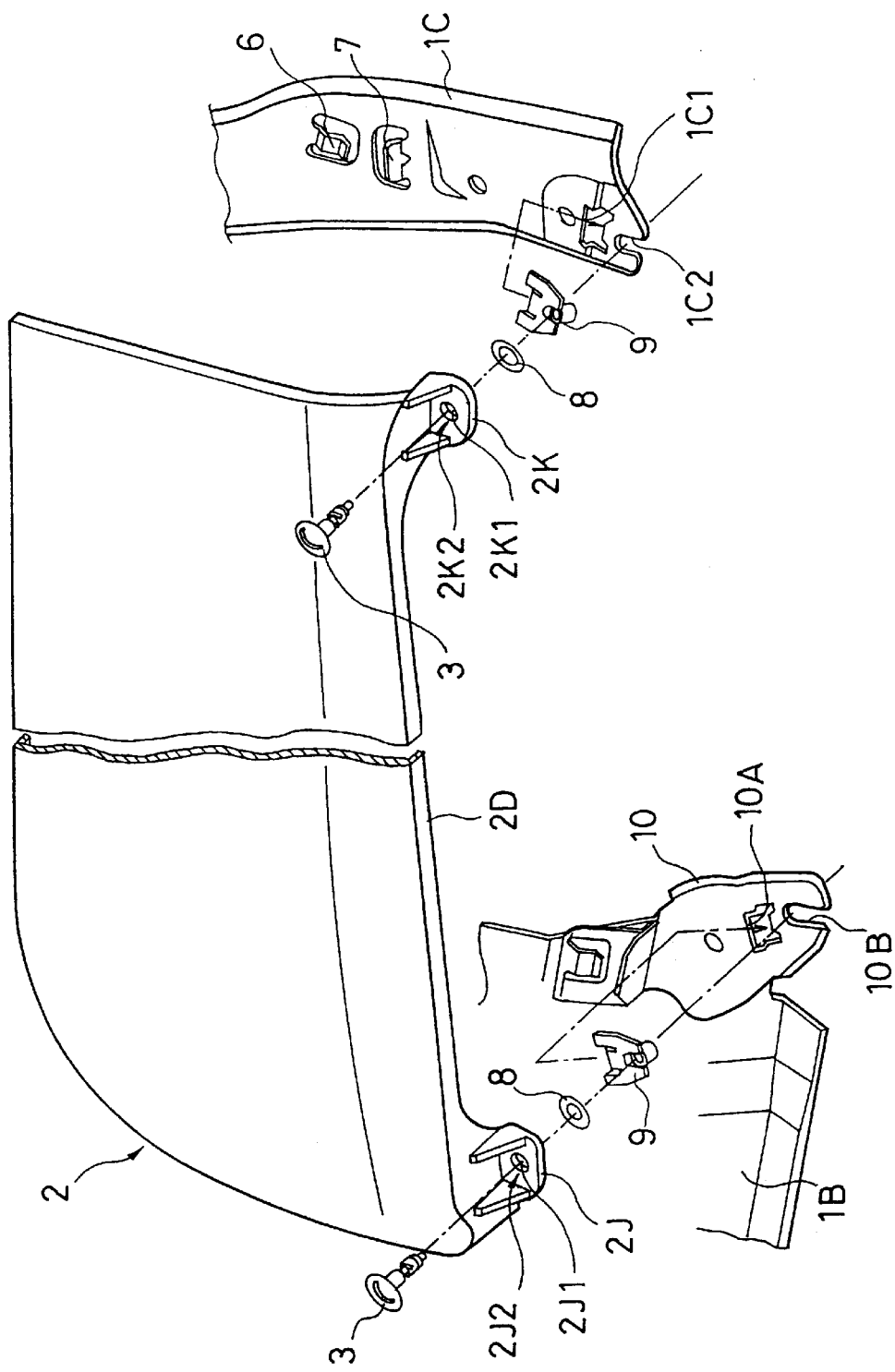
FIG. 4 is a perspective view showing a tightening structure of the wheel house cover of the attaching, structure for a wheel house cover according to the embodiment.
Figure 5:
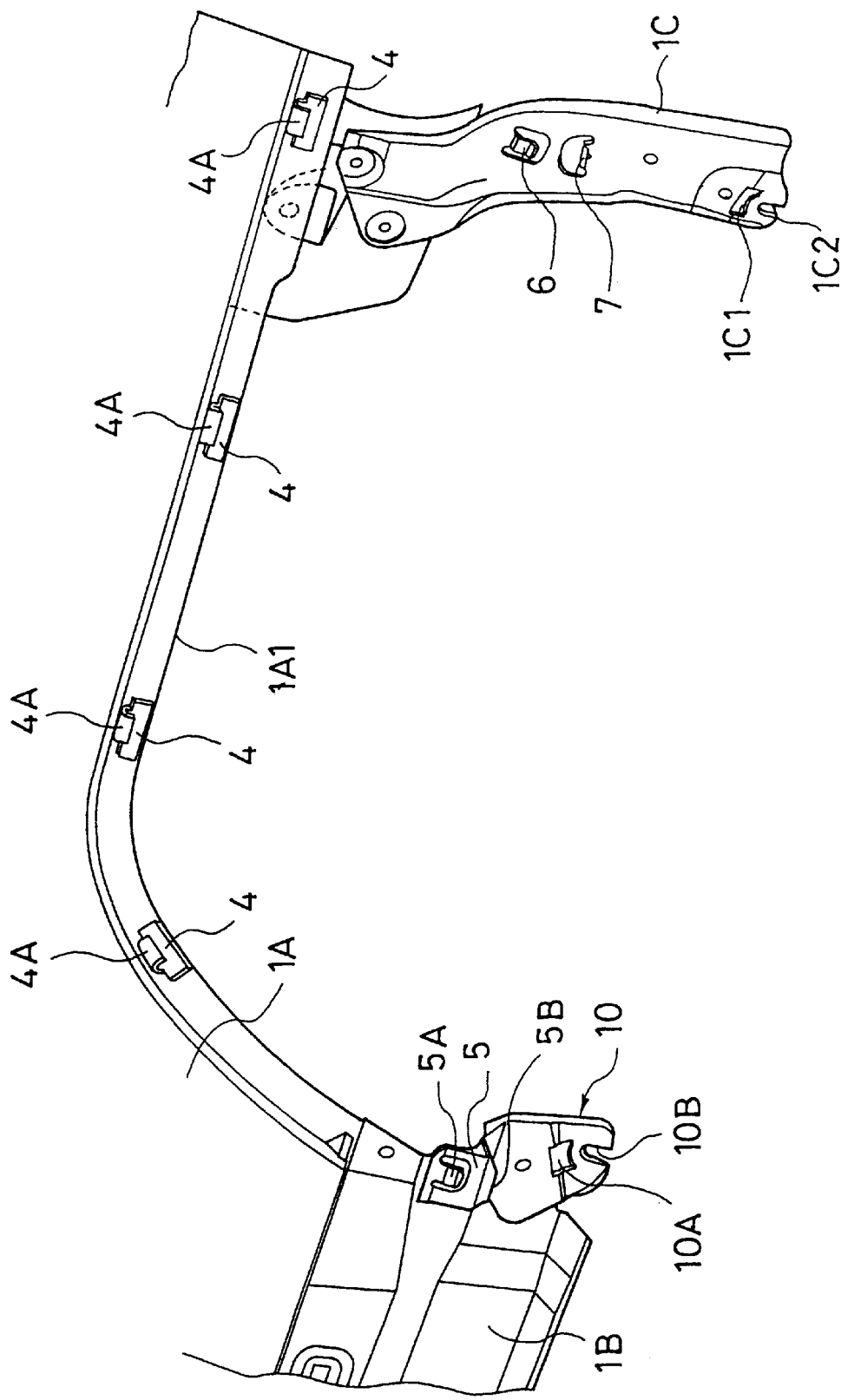
FIG. 5 is a perspective view showing structure of a side of the vehicle body of the attaching structure for a wheel house cover according to the embodiment.

An embodiment of the present invention will now be described specifically by referring to drawings. FIG. 1 is a perspective view in the vicinity of a wheel house cover of a vehicle body to which the attaching structure for a wheel house cover is applied according to the embodiment. FIG. 2 is a perspective view of a reverse side structure of the wheel house cover of the attaching structure for a wheel house cover according to the embodiment. FIG. 3 is a section showing an engagement structure of the wheel house cover of the attaching structure for a wheel house cover according to the embodiment. FIG. 4 is a perspective view showing a tightening structure of the wheel house cover of the attaching structure for a wheel house cover according to the embodiment. FIG. 5 is a perspective view showing structure of a side of the vehicle body of the attaching structure for a wheel house cover according to the embodiment.

The structure according to the embodiment, as shown in FIG. 1, has a rear fender panel 1A, a floor panel 1B and a rear stay 1C forming a vehicle body 1, these are support members, and a wheel house cover 2 is detachably attached to the vehicle body 1.

The wheel house cover 2 is made from appropriate resin material such as structural synthetic resin and molded integrally in a side shape as shown in FIG. 1. The wheel house cover 2 has a size of about 60 cm in length, about 35–40 cm in height and about 3.5 mm in thickness. On a reverse side of the wheel house cover 2, as shown in FIG. 2, a top edge rib 2A, a front edge rib 2B, a rear edge rib 2C and a lower edge rib 2D are molded continuously and protrude in a direction slanting inwardly along an edge of the reverse side.

As for an engagement structure of the wheel house cover 2, engagement parts 2E are placed side-by-side on three points and molded integrally at the top edge rib 2A. Engagement parts 2F and 2G are placed vertically and molded integrally at the front edge rib 2B. An engagement part 2H is molded integrally in the vicinity of a center part of the rear edge rib 2C in a vertical direction.

Each engagement part 2E, as shown in FIG. 3, is protruded downwardly and continuously and has a substantially L-shaped section at a front end of the top edge rib 2A. At a corner of each engagement part 2E, an upwardly opened engagement hole 2E1 is formed. On an outer surface of a lower edge part of each engagement part 2E opposite to the wheel house cover 2, a protrusion 2E2 is formed. As shown in FIG. 2, the engagement part 2F has a substantially L-shaped section similar to the engagement part 2E. At a corner of the engagement part 2F, an upwardly opened engagement hole 2F1 is formed. In this case, the engagement part 2F is formed in a direction slanting along an inclined part of the front edge rib 2B. Therefore, widths of the engagement part 2F and the engagement hole 2F1 in a plan view are set to be equal to widths of the engagement part 2E and the engagement hole 2E1.

The engagement part 2G, as shown in FIG. 2, has a L-shaped wall part in a plan view projecting from a front end of the front edge rib 2B and bent toward the rear edge rib 2C, and a bottom part formed between the wall parts. On an inside of each wall part, an upwardly opened engagement concave 2G1 is formed. The engagement part 2H is formed as with the engagement part 2G substantially. The engagement part 2H has a L-shaped wall part in a plan view projecting from a front end of the rear edge rib 2C and bent toward the front edge rib 2B, and a bottom part formed between the wall parts. On an inside of each wall part, an upwardly opened engagement concave 2H1 is formed.

As for the tightening structure of the wheel house cover 2, foot parts 2J and 2K downwardly projecting are molded integrally in the vicinity of the front edge rib 2B and the rear edge rib 2C, and more specifically, at front and rear ends of the lower edge rib 2D. The foot parts 2J and 2K, as shown in FIG. 2 and FIG. 4, are placed at blind spots taking shelter in the reverse side of the wheel house cover 2. More specifically, the foot parts 2J and 2K are placed at places to be blind spots of a lower part of the wheel house cover 2 when the wheel house cover 2 is overlooked. As shown in FIG. 4, insertion holes 2J1 and 2K1 for corresponding stud fasteners 3 of the tightening member for the vehicle body I are formed at the foot parts 2J and 2K, respectively. Marks 2J2 and 2K2 for rotating operation of the stud fasteners 3, 3 are provided in the vicinity of the insertion holes 2J1 and 2K1.

As for engagement structure of the wheel house cover 2 at the vehicle body 1, as shown in FIG. 5, a locking member 4 for engaging each engagement part 2E and the engagement part 2F on the side of the wheel house cover 2 is fixed at a flange part 1A1 of the rear fender panel 1A facing a wheel house. A locking member 5 for engaging engagement part 2G on the side of the wheel house cover 2 is fixed at a rear end of the floor panel 1B facing a wheel house. A locking member 6 for engaging engagement part 2H of the wheel house cover 2 is formed at the rear stay 1C facing a wheel house.

Each locking member 4 is a sheet metal member for spot welding to the rear fender panel 1A. As shown in FIG. 3, a hook 4A having an inverted U-shaped section downwardly projecting is formed. The hook 4A approaches downwardly and relatively with respect to the engagement hole 2E1 of the engagement part 2E at the wheel house cover 2. Therefore, the hook 4A has a function of a locking part fastening and locking the engagement part 2E.

Figure 6:
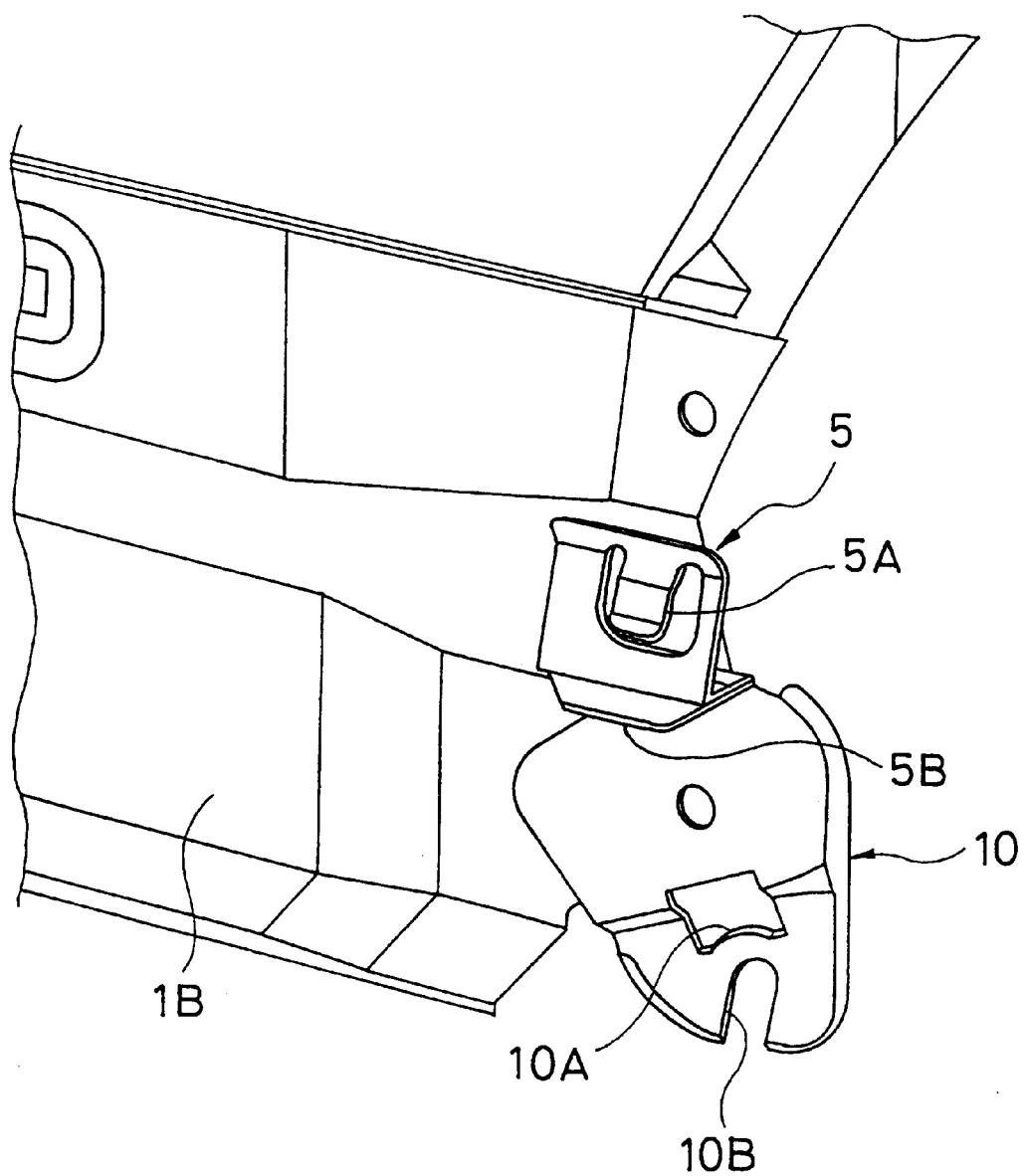
FIG. 6 is a perspective view showing structure in the vicinity of a rear edge of a floor panel of the attaching structure for a wheel house cover according to the embodiment.
Figure 7:
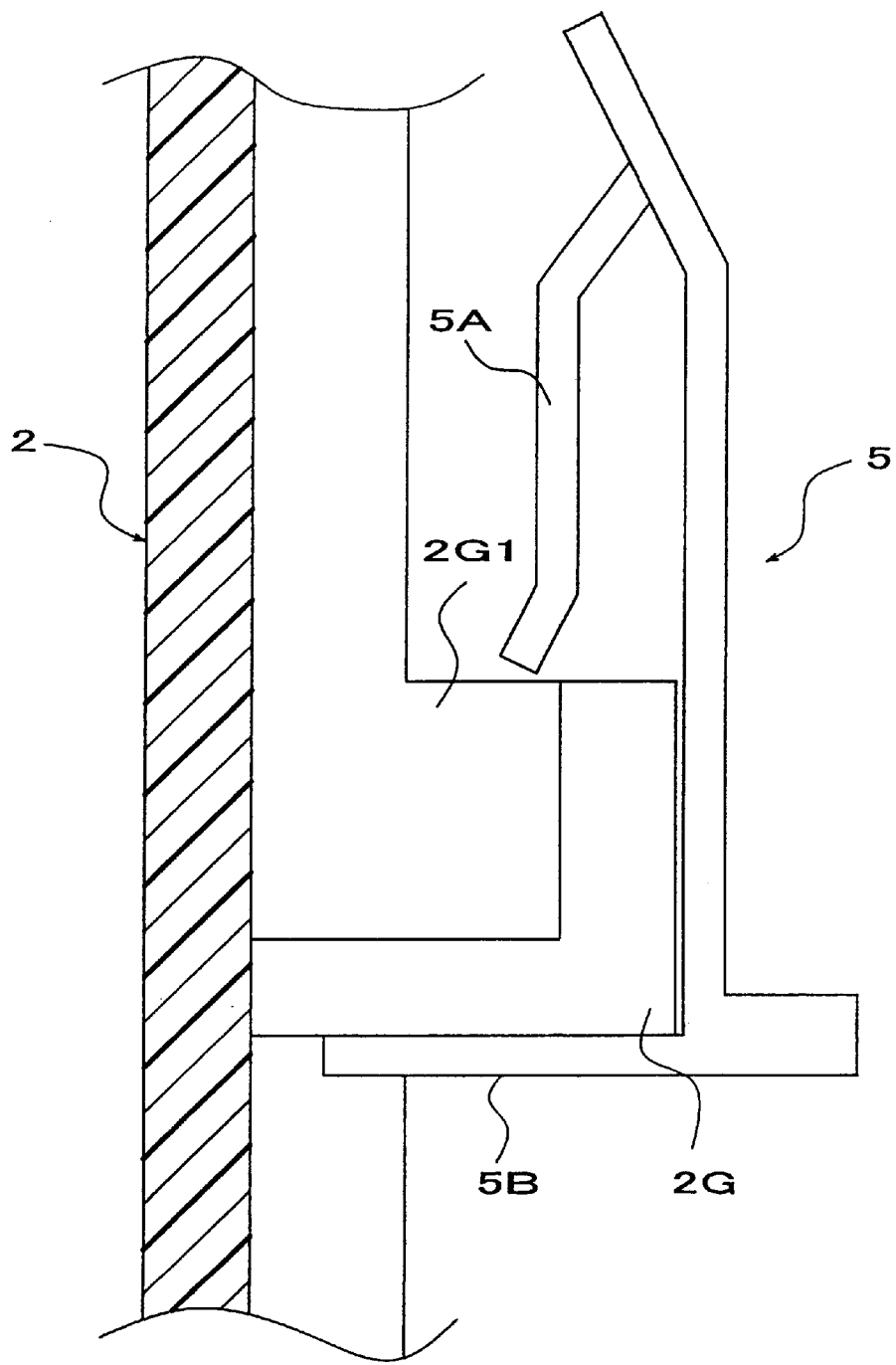
FIG. 7 is a section showing a state in which the wheel house cover of the attaching structure for a wheel house cover according to the embodiment is temporarily positioned.

The locking member 5, as shown in FIG. 6, is a sheet metal member for spot welding to the floor panel 1B and a hook 5A downwardly projecting is cut, raised and formed. The hook 5A, as shown in FIG. 7, can approach downwardly and relatively with respect to an engagement concave 2G1 of the engagement part 2G at the wheel house cover 2. Therefore, the hook 5A has a function of a locking part fastening and locking the wall part of the engagement part 2G.

Figure 8:
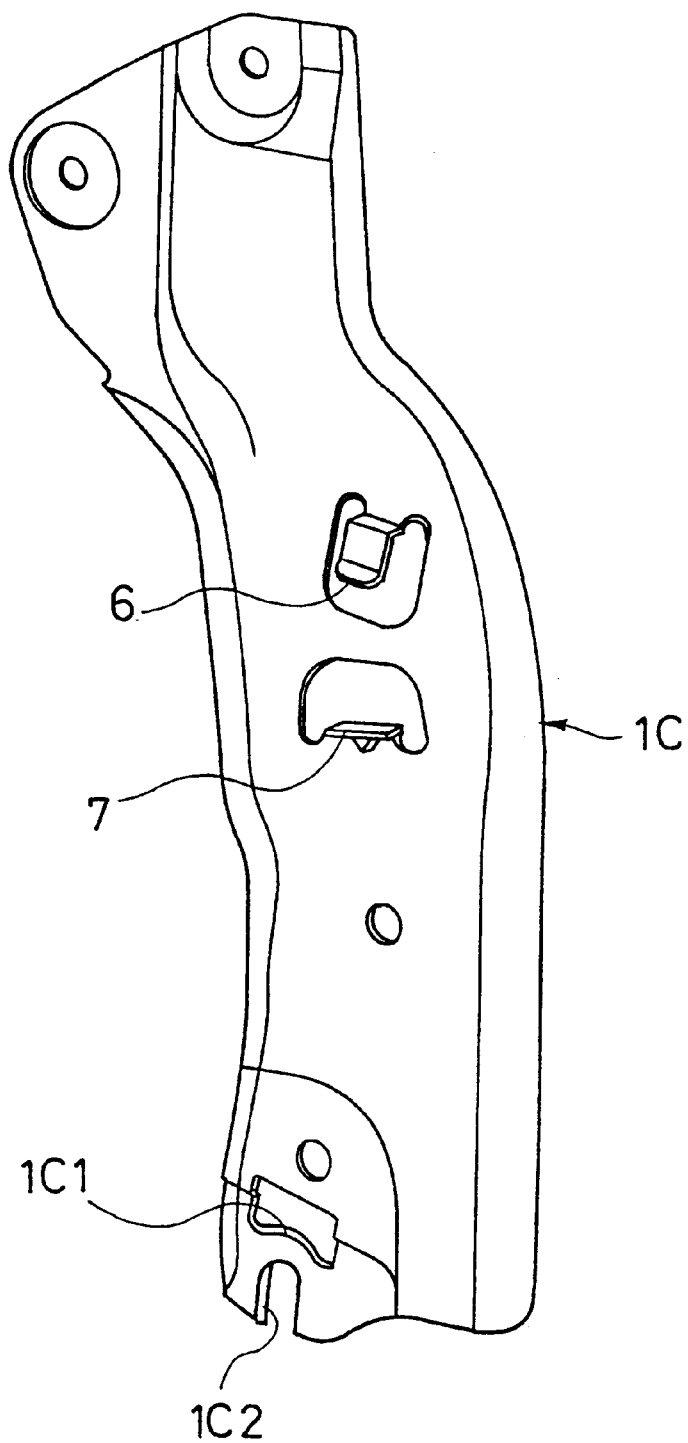
FIG. 8 is a perspective view showing structure of a rear stay part of the attaching structure for a wheel house cover according to the embodiment.

The locking member 6, as shown in FIG. 8, is shaped like a hook downwardly projecting and the locking member 6 is cut, raised and formed. The locking member 6 can approach downwardly and relatively with respect to an engagement concave 2H1 of the engagement part 2H at the wheel house cover 2. Therefore, the locking member 6 has a function of a locking part fastening and locking the wall part of the engagement part 2H.

As for temporarily positioning the structure of the wheel house cover 2, a pair of support parts, on which the front engagement part 2G and the rear engagement part 2H at the wheel house cover 2 are provided, projects, and the pair of support parts is provided at the vehicle body 1. More specifically, on the locking member 5 fixed at the floor panel 1B, as shown in FIG. 7, a support part 5B, on which the engagement part 2G is provided, projects from a lower part of the hook 5A, and the support part 5B is provided at the wheel house cover 2 in a substantially horizontal position. As shown in FIG. 8, at the rear stay 1C, a support part 7 is placed below the, locking member 6 and where it is cut, raised and formed. The support part 7 projects and it is provided at the wheel house cover 2 in a substantially horizontal position for providing the engagement parts 2H thereon.

The support part 5B protruded and provided on the locking member 5 is placed at a vertical position where the engagement part 2G at the wheel house cover 2 can be temporarily positioned directly below the hook 5A. Similarly, the support part 7 is placed at a place vertically on which the engagement part 2H on the side of the wheel house cover 2 can be temporarily positioned directly below the locking member 6. The temporarily positioning state is generally set wherein the wheel house cover 2 can be moved upwardly about 20 mm.

As for the tightening structure of the wheel house cover at the vehicle body 1, as shown in FIG. 4, nut members 9, 9 are provided as receiving parts to receive the corresponding stud fasteners 3, 3 via retainer rings 8,8. The stud fasteners 3 are inserted into the insertion holes 2J1 and 2K1 of the wheel house cover 2. More specifically, one nut member 9 is placed at an attaching bracket 10 subjected to spot welding at a rear end of the floor panel 1B via an opening 10A of the attaching bracket 10. Another nut member 9 is placed at a lower end of the rear stay 1C via an opening 1C1 of the rear stay 1C. Cutouts 10B and 1C2 are formed at a lower end of the attaching bracket 10 and the lower end of the rear stay 1C wherein the stud fasteners 3, 3 can be moved upwardly.

Figure 9:
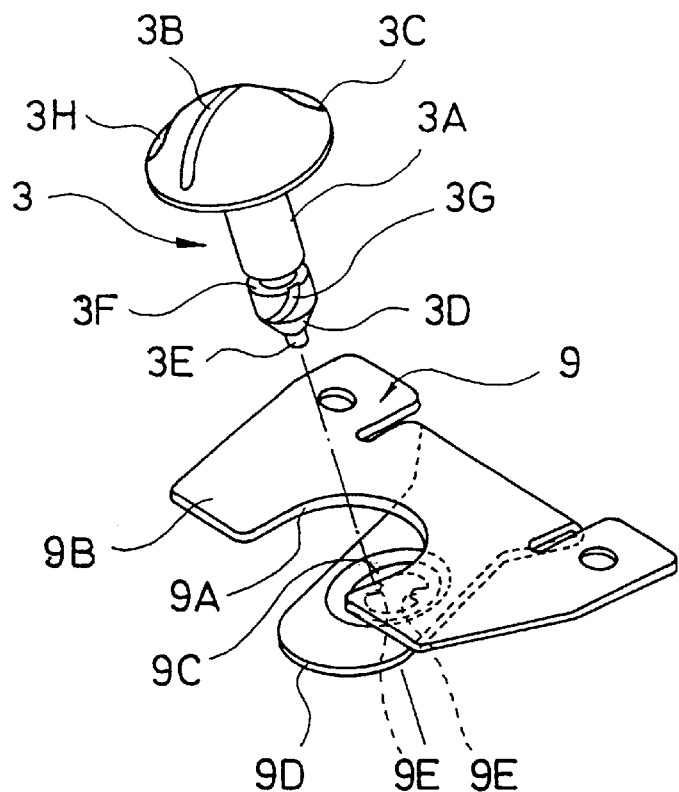
FIG. 9 is a perspective view of a stud fastener and a nut member of the attaching structure for a wheel house cover according to the embodiment.

The stud fastener 3, as shown in FIG. 9, has a head part 3C having a channel 3B for rotating operation on a base end side of a shaft part 3A. A small-diameter front end 3E is formed on a front end side of the shaft part 3A via a taper part 3D. On a periphery of the shaft part 3A of the stud fastener 3, a ring-shaped channel 3F and a pair of lead channels 3G, 3G extending from the ring-shaped channel 3F to the taper part 3D are formed. A mark 3H for rotating operation is provided on the head part 3C.

The nut member 9 has a base part 9B and a guide part 9D folded. The base part 9B has a cutout 9A for inserting the stud fastener 3. The guide part 9D has a nut part 9C for receiving the stud fastener 3. For example, the nut member 9 is fastened by the attaching bracket 10 via the opening 10A. A front end side of the guide part 9D has a function of a guide plate guiding the front end 3E of the stud fastener 3 to the nut part 9C (see FIGS. 4 and 9).

Figure 10:
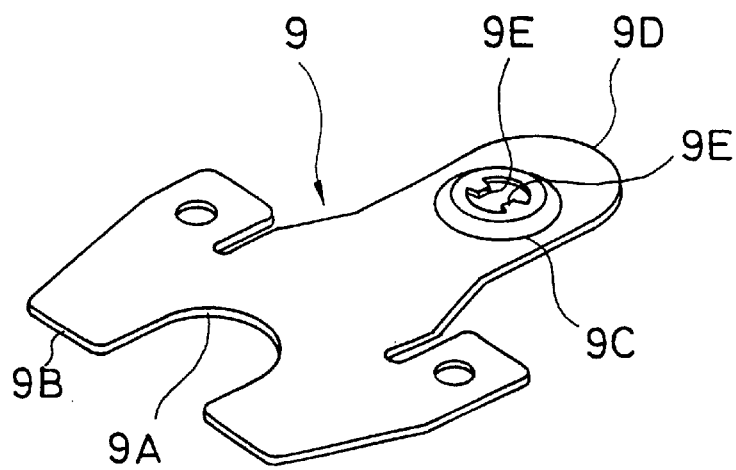
FIG. 10 is a developed perspective view of the nut member of the attaching structure for a wheel house cover according to the embodiment.
Figure 11:
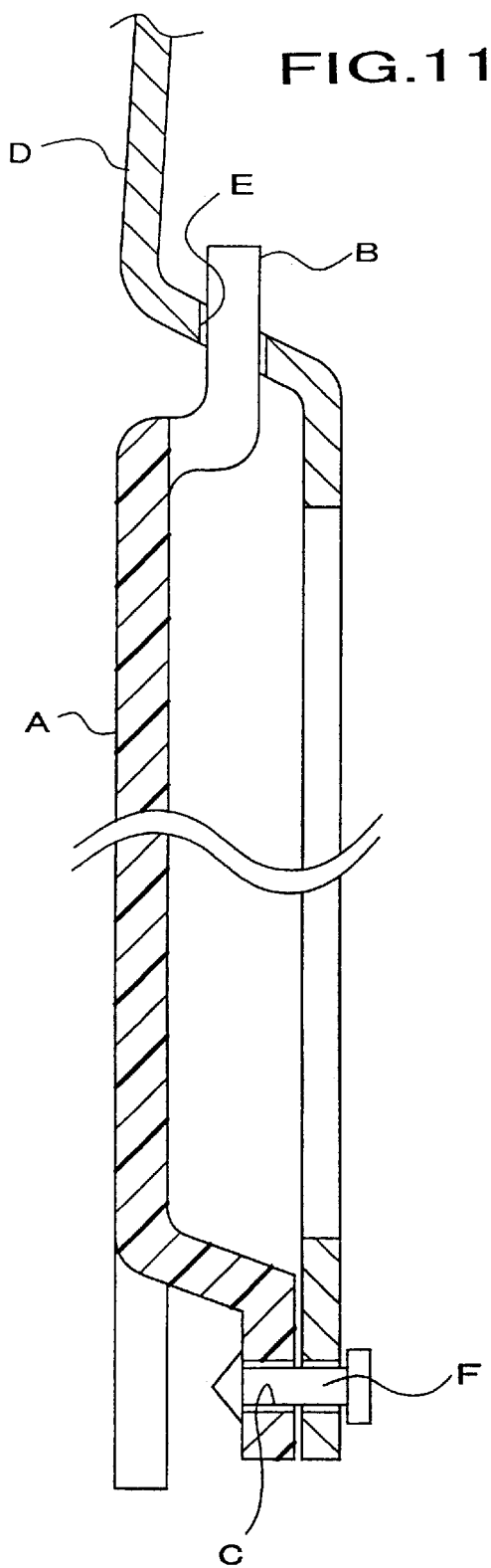
FIG. 11 is a section of a conventional attaching structure for a wheel house cover.

The nut member 9, as shown in FIG. 10, is stamped, sheet metal. On an inner periphery of the nut part 9C, a pair of fit hooks 9E, 9E for fitting with the pair of lead channels 3G, 3G of the stud fasteners 3, 3 are formed.

According to the above-described structure of the embodiment, when the wheel house cover 2 is attached to the vehicle body 1, a peripheral edge of the wheel house cover 2 is suited with the wheel house of the vehicle body 1. The engagement part 2G of the wheel house cover 2 shown in FIG. 2 is mounted on the support part 5B of the locking member 5 of the vehicle body 1 shown in FIG. 5 (see FIG. 7). The engagement part 2H of the wheel house cover 2 is mounted on the support part 7 of the vehicle body 1, and then the wheel house cover 2 is pushed to the vehicle body 1 and temporarily positioned.

In the temporarily positioning state, the engagement concave 2G1 of the engagement part 2G at the wheel house cover 2 is positioned directly below the hook 5A of the locking member 5 at the vehicle body 1. Similarly, the engagement concave 2H1 of the engagement part 2H is positioned directly below the engagement part 6. The engagement holes 2E1 and 2F1 of the engagement parts 2E and 2F at the wheel house cover 2 are positioned directly below the corresponding hooks 4A of the locking members 4 at the vehicle body 1. The wheel house cover 2 is then pushed upwardly with respect to the vehicle body 1.

As the wheel house cover 2 is pushed, therefore, the hook 4A of the locking member 4 at the vehicle body 1 approaches downwardly and relatively with respect to the engagement holes 2E1 and 2F1 of the engagement parts 2E and 2F at the wheel house cover 2. The hook 5A of the locking member 5 approaches downwardly and relatively with respect to the engagement concave 2G1 of the engagement part 2G. Similarly, the engagement part 6 approaches downwardly and relatively with respect to the engagement concave 2H1 of the engagement part 2H. For example, the engagement part 2E, as shown in FIG. 3, is fastened by the hook 4A approaching the engagement hole 2E1 and locked. The engagement parts 2F, 2G and 2H are locked similarly (not shown).

As shown in FIG. 4, the foot parts 2J and 2K of the wheel house cover 2 are tightened at the attaching bracket 10 and the rear stay 1C of the vehicle body 1, respectively. More specifically, the stud fasteners 3, 3 inserted into the insertion holes 2J1 and 2K1 of the foot parts 2J and 2K are received at the nut member 9 mounted on the attaching bracket 10 in advance and the nut member 9 is mounted on the rear stay 1C in advance. In this case, the stud fasteners 3, 3 are mounted at the foot parts 2J and 2K with the retainer rings 8, 8 in advance, and therefore, tightening operation is easy.

In a case in which the stud fasteners 3, 3 are mounted at the foot parts 2J and 2K in advance, when the wheel house cover 2 temporarily positioned as described above is pushed upwardly, a front end side of each guide part 9D of the nut member 9 shows a function as a guide plate and guides the front end parts 3E, 3E of the stud fasteners 3, 3 to the nut parts 9C, 9C. Therefore, each stud fastener 3 can be screwed in the corresponding nut part 9C with reliability. For example, the mark 3H of the stud fastener 3 is aligned with the mark 2J2 of the foot parts 2J. Therefore, rotating operation for screwing the stud fastener 3 in the nut part 9C can be done easily without troublesome torque control.

As above-described, according to the structure of the embodiment, the wheel house cover 2 is temporarily positioned with respect to the vehicle body 1 and the wheel house cover 2 is pushed upwardly. The foot parts 2J and 2K of the wheel house cover 2 are tightened with the nut members 9, 9 of the vehicle body 1 by the stud fasteners 3, 3. Therefore, by the above described exceedingly easy operation, the wheel house cover 2 can be attached to the vehicle body 1. By reverse procedure, the wheel house cover 2 can easily be detached from vehicle body 1. Therefore, the wheel house cover 2 can easily be attached to and detached from vehicle body 1.

According to the structure of the embodiment, the hook 4A of each locking member 4 fixed to the flange part 1A1 of the rear fender panel 1A is flipped and protruded downward. Therefore, at attaching the wheel house cover 2, each hook 4A is hidden behind a reverse side of the wheel house cover 2. More specifically, each hook 4A does not project from the top edge rib 2A of the wheel house cover 2, and therefore, the vehicle body I has a good appearance. The foot parts 2J and 2K of the wheel house cover 2 are placed at places to be blind spots of a lower part of the wheel house cover 2 when the wheel house cover 2 is overlooked. Therefore, the foot parts 2J and 2K and the stud fasteners 3, 3 are resistant to being seen and the vehicle body 1 also can have a good appearance in this respect.

According to the structure of the embodiment, the engagement holes 2E1 and 2F1 and the engagement concaves 2G1 and 2H1 are formed at the wheel house cover 2. An engagement hole and an engagement concave are not formed at the vehicle body 1. Therefore, the formation of rust can be reduced on the side of the vehicle body 1.

The shapes of the above-described engagement parts 2E and 2F of the wheel house cover 2 are not limited to the shapes shown in the drawings. For example, the shape may be a U-shaped section continuing the front ends of the top edge rib 2A and the front edge rib 2B.

As described above, according to the structure of the present invention, the engagement part of the wheel house cover is positioned below the locking part of the vehicle body. The wheel house cover is pushed upwardly with respect to the vehicle body. The locking part of the vehicle body approaches downwardly and relatively with respect to the engagement hole or engagement concave of the engagement part at the wheel house cover, and in this state, the engagement part is locked. The tightening member is received by the receiving part on the vehicle body side through the insertion hole from the outside of the wheel house cover, and therefore, the wheel house cover can be detachably attached to a vehicle body.

More specifically, according to the structure of the present invention, the wheel house cover is pushed upwardly with respect to the vehicle body and the tightening member is received from the outside of the wheel house cover. Therefore, by above-described simple operations, the wheel house cover can be attached to a vehicle body and by reverse procedure, the wheel house cover can be detached from vehicle body. Accordingly, the wheel house cover can easily be attached to and detached from vehicle body. The engagement holes and the engagement concaves are formed at the wheel house cover and an engagement hole and an engagement concave are not formed at the vehicle body. Therefore, the formation of rust can be reduced at the vehicle body 1.

According to the structure of the present invention, a pair of support parts is provided and projects from the vehicle body for placing at least two front and rear engagement parts among the engagement parts of the wheel house cover. The pair of support parts is placed at vertical positions where the engagement parts on the side of the wheel house cover can be temporarily positioned directly below the locking part of the vehicle body. The two front and rear engagement parts of the wheel house cover are placed at the pair of support parts of the vehicle body and the engagement parts of the wheel house cover are temporarily positioned directly below the locking part of the vehicle body. Therefore, it is still easier to attach and detach the wheel house cover.

According to the structure of the present invention, locking members in a shape of a downwardly projecting hook are fixed to the vehicle body and the locking parts of the vehicle body are formed by the hooks of the locking members. In a state in which the wheel house cover is attached, the hooks of the locking members at the vehicle body downwardly project and the hooks are hidden behind a reverse side of the wheel house cover. Therefore, the vehicle body can have a good appearance.

According to the structure of the present invention, each of the insertion holes for the tightening member is formed on a front and a rear foot part, each projecting from the wheel house cover, and the foot parts are placed at blind spots of a lower edge part of the wheel house cover. In a state in which the wheel house cover is attached, the foot parts and the tightening member are placed at the blind spots of the lower edge part of the wheel house cover. Therefore, the vehicle body has a good appearance.

According to the structure of the present invention, the tightening member is a stud fastener, and the receiving part on the side of the vehicle body is formed by a nut member fixed to the vehicle body, and the nut member has a guide plate, which guides the front end of the stud fastener toward a nut part of the nut member. When the wheel house cover is moved upwardly with respect to the vehicle body and attached to the vehicle body, the guide plate of the nut member guides the front end of the stud fastener toward the nut part. Therefore, it is easy to receive the stud fastener.

It is contemplated that numerous modifications may be made to the structure for detachably attaching a wheel house cover to a vehicle body of the present invention without departing from the spirit and scope of the invention as defined in the following claims.

What is claimed is:

1. A structure which detachably attaches a wheel house cover to a vehicle body, comprising:

engagement parts, provided along a reverse side of a peripheral edge of said wheel house cover and having at least one of an upwardly opened engagement hole and an upwardly opened engagement concave;

at least one tightening member;

at least one insertion hole, provided at one of a front peripheral edge and a rear peripheral edge of said wheel house cover, and proximate to a lower edge of said wheel house cover, into which said at least one tightening member is inserted;

locking parts, provided on said vehicle body and interlocking said vehicle body to said wheel house cover bye inserting said engagement parts into corresponding ones of said locking parts; and at least one receiving part, provided on said vehicle body and disposed between said vehicle body and said wheel house cover and correspondingly receiving said at least one tightening member inserted into said at least one insertion hole when said vehicle body and said wheel house cover are interlocked, wherein said locking parts and said engagement parts interlock by relatively and upwardly inserting at least one of said upwardly opened engagement hole and said upwardly opened engagement concave into at least a corresponding one of said locking parts.

2. The structure as claimed in claim 1, wherein each of said at least one insertion hole is formed on a foot part projecting from said wheel house cover, proximate to a lower edge of said wheel house cover, and placed at a blind spot.

3. A structure which detachably attaches a wheel house cover to a vehicle body, comprising:

engagement parts, provided along a reverse side of a peripheral edge of said wheel house cover and having at least one of an upwardly opened engagement hole and an upwardly opened engagement concave;

at least one tightening member;

at least one insertion hole, provided at one of a front peripheral edge and a rear peripheral edge of said wheel house cover, and proximate to a lower edge of said wheel house cover, into which said at least one tightening member is inserted;

locking parts, provided on said vehicle body and interlocking said vehicle body to said wheel house cover by inserting said engagement parts into corresponding ones of said locking parts;

at least one receiving part, provided on said vehicle body and correspondingly receiving said at least one tightening member inserted into said at least one insertion hole when said vehicle body and said wheel house cover are interlocked, wherein said locking parts and said engagement parts interlock by relatively and upwardly inserting at least one of said upwardly opened engagement hole and said upwardly opened engagement concave into at least a corresponding one of said locking parts; and at least one support part, projecting from said vehicle body directly below at least one of said locking parts, wherein at least one of said engagement parts is temporarily positioned on a corresponding support part, such that when said wheel house cover is moved upwardly, said wheel house cover and said vehicle body interlock.

4. The structure as claimed in claim 3, wherein said locking parts comprise locking members, fixed to said vehicle body and having a shape of a downwardly projecting hook.

5. The structure as claimed in claim 3, wherein each of said at least one insertion hole is formed on foot part projecting from said wheel house cover, proximate to a lower edge of said wheel house cover, and placed at a blind spot.

6. The structure as claimed in claim 3, wherein:

said at least one tightening member is a stud fastener, and said at least one receiving part of said vehicle body is formed by a nut member fixed to said vehicle body, said nut member further comprising a guide plate which guides a front end of said stud fastener toward a nut part.

7. The structure as claimed in claim 4, wherein each of said at least one insertion hole is formed on foot part projecting from said wheel house cover, proximate to a lower edge of said wheel house cover, and placed at a blind spot.

8. The structure as claimed in claim 4, wherein said at least one tightening member is a stud fastener, and said at least one receiving part of said vehicle body is formed by a nut member fixed to said vehicle body, said nut member further comprising a guide plate which guides a front end of said stud fastener toward a nut part.

9. The structure as claimed in claim 5, wherein said at least one tightening member is a stud fastener, and said at least one receiving part of said vehicle body is formed by a nut member fixed to said vehicle body, said nut member further comprising a guide plate which guides a front end of said stud fastener toward a nut part.

10. The structure as claimed in claim 7, wherein:

said at least one tightening member is a stud fastener, and said at least one receiving part of said vehicle body is formed by a nut member fixed to said vehicle body, said nut member further comprising a guide plate which guides a front end of said stud fastener toward a nut part.

11. A structure which detachably attaches a wheel house cover to a vehicle body, comprising:

engagement parts, provided along a reverse side of a peripheral edge of said wheel house cover and having at least one of an upwardly opened engagement hole and an upwardly opened engagement concave;

at least one tightening member;

at least one insertion hole, provided at one of a front peripheral edge and a rear peripheral edge of said wheel house cover, and proximate to a lower edge of said wheel house cover, into which said at least one tightening member is inserted;

locking parts, provided on said vehicle body and interlocking said vehicle body to said wheel house cover by inserting said engagement parts into corresponding ones of said locking parts; and at least one receiving part, provided on said vehicle body and correspondingly receiving said at least one tightening member inserted into said at least one insertion hole when said vehicle body and said wheel house cover are interlocked, wherein said locking parts and said engagement parts interlock by relatively and upwardly inserting at least one of said upwardly opened engagement hole and said upwardly opened engagement concave into at least a corresponding one of said locking parts, and wherein said locking parts comprise locking members, fixed to said vehicle body and having a shape of a downwardly projecting hook.

12. The structure as claimed in claim 11, wherein each of said at least one insertion hole is formed on foot part projecting from said wheel house cover, proximate to a lower edge of said wheel house cover, and placed at a blind spot.

13. The structure as claimed in claim 11, wherein:

said at least one tightening member is a stud fastener, and said at least one receiving part of said vehicle body is formed by a nut member fixed to said vehicle body, said nut member further comprising a guide plate which guides a front end of said stud fastener toward a nut part.

14. The structure as claimed in claim 12, wherein:

said at least one tightening member is a stud fastener, and said at least one receiving part of said vehicle body is formed by a nut member fixed to said vehicle body, said nut member further comprising a guide plate which guides a front end of said stud fastener toward a nut part.

15. A structure which detachably attaches a wheel house cover to a vehicle body, comprising:

engagement parts, provided along a reverse side of a peripheral edge of said wheel house cover and having at least one of an upwardly opened engagement hole and an upwardly opened engagement concave;

at least one tightening member;

at least one insertion hole, provided at one of a front peripheral edge and a rear peripheral edge of said wheel house cover, and proximate to a lower edge of said wheel house cover, into which said at least one tightening member is inserted;

locking parts, provided on said vehicle body and interlocking said vehicle body to said wheel house cover by inserting said engagement parts into corresponding ones of said locking parts; and at least one receiving part, provided on said vehicle body and correspondingly receiving said at least one tightening member inserted into said at least one insertion hole when said vehicle body and said wheel house cover are interlocked, wherein said locking parts and said engagement parts interlock by relatively and upwardly inserting at least one of said upwardly opened engagement hole and said upwardly opened engagement concave into at least a corresponding one of said locking parts, and wherein each of said at least one insertion hole is formed on a foot part projecting from said wheel house cover, proximate to a lower edge of said wheel house cover, and placed at a blind spot, wherein said at least one tightening member is a stud fastener, and said at least one receiving part of said vehicle body is formed by a nut member fixed to said vehicle body, said nut member further comprising a guide plate which guides a front end of said stud fastener toward a nut part.

16. A structure which detachably attaches a wheel house cover to a vehicle body, comprising:

engagement parts, provided along a reverse side of a peripheral edge of said wheel house cover and having at least one of an upwardly opened engagement hole and an upwardly opened engagement concave;

at least one tightening member;

at least one insertion hole, provided at one of a front peripheral edge and a rear peripheral edge of said wheel house cover, and proximate to a lower edge of said wheel house cover, into which said at least one tightening member is inserted;

locking parts, provided on said vehicle body and interlocking said vehicle body to said wheel house cover by inserting said engagement parts into corresponding ones of said locking parts; and at least one receiving part, provided on said vehicle body and correspondingly receiving said at least one tightening member inserted into said at least one insertion hole when said vehicle body and said wheel house cover are interlocked, wherein said locking parts and said engagement parts interlock by relatively and upwardly inserting at least one of said upwardly opened engagement hole and said upwardly opened engagement concave into at least a corresponding one of said locking parts, and wherein said at least one tightening member is a stud fastener, and said at least one receiving part of said vehicle body is formed by a nut member fixed to said vehicle body, said nut member further comprising a guide plate which guides a front end of said stud fastener toward a nut part.

\* \* \* \* \*